G. EVERSON.
ADDING MACHINE.
APPLICATION FILED FEB. 7, 1911.

1,126,742.

Patented Feb. 2, 1915.
8 SHEETS—SHEET 1.

G. EVERSON.
ADDING MACHINE.
APPLICATION FILED FEB. 7, 1911.

1,126,742.

Patented Feb. 2, 1915.
8 SHEETS—SHEET 2.

Witnesses

Inventor
George Everson
By Lewis E. Flanders
Attorney

G. EVERSON.
ADDING MACHINE.
APPLICATION FILED FEB. 7, 1911.

1,126,742.

Patented Feb. 2, 1915.

8 SHEETS—SHEET 3.

Witnesses

Inventor
George Everson
By Lewis E. Flanders
Attorney

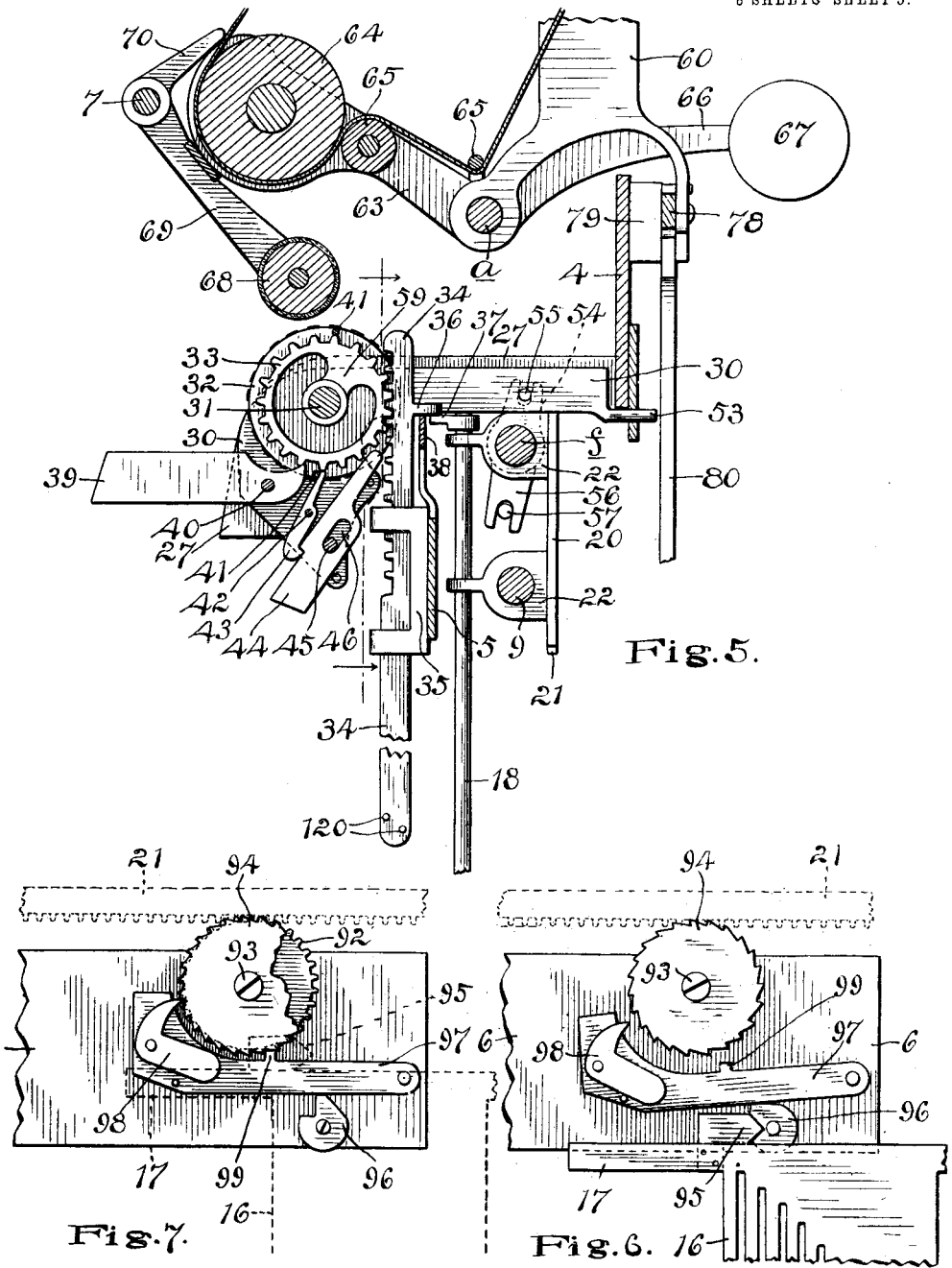

G. EVERSON.
ADDING MACHINE.
APPLICATION FILED FEB. 7, 1911.

1,126,742.

Patented Feb. 2, 1915.
8 SHEETS—SHEET 6.

Witnesses
G. E. McBrann
O. W. Shannon

Inventor
George Everson
By Lewis E. Flanders
Attorney

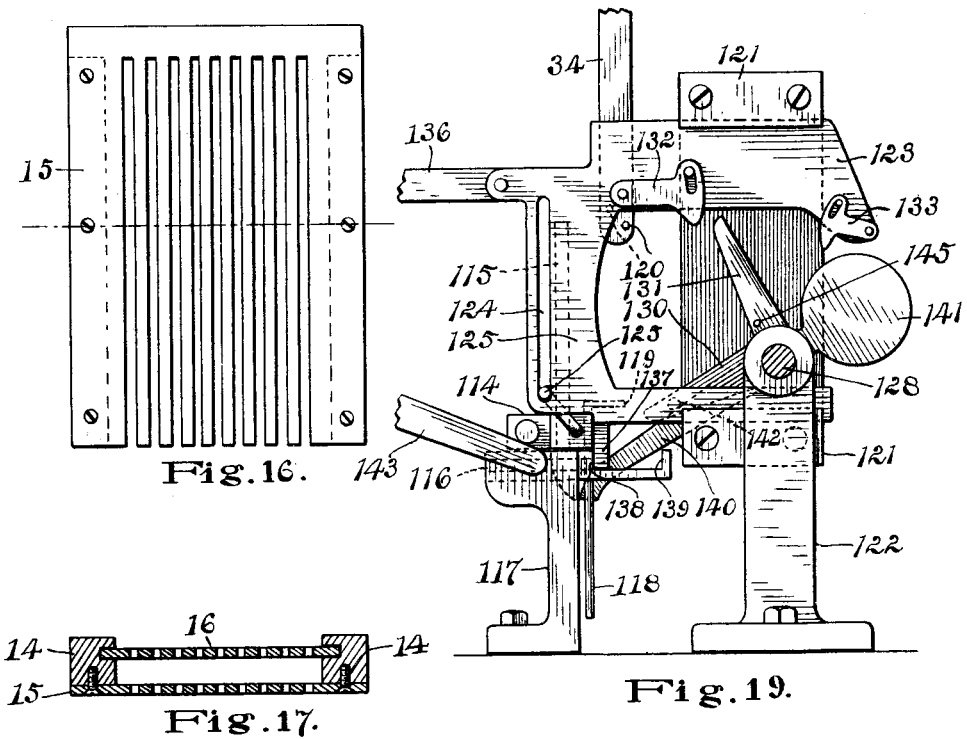
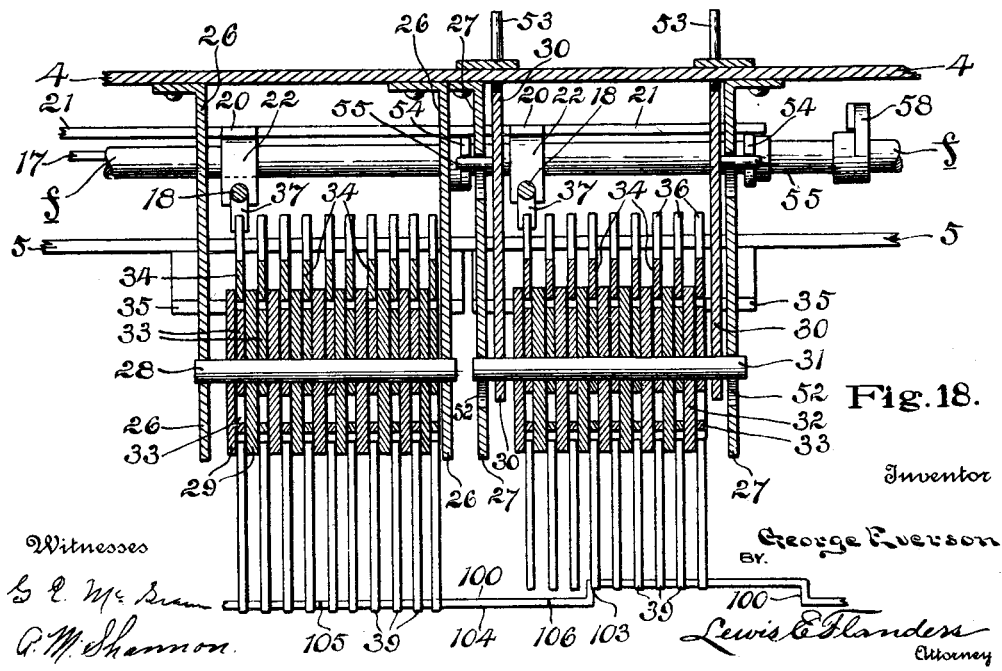

G. EVERSON.
ADDING MACHINE.
APPLICATION FILED FEB. 7, 1911.

1,126,742.

Patented Feb. 2, 1915.
8 SHEETS—SHEET 8

Witnesses
T. E. McGrann
C. W. Shannon

Inventor
George Everson
By Lewis E. Flanders
Attorney

UNITED STATES PATENT OFFICE.

GEORGE EVERSON, OF DETROIT, MICHIGAN.

ADDING-MACHINE.

1,126,742.  Specification of Letters Patent.  Patented Feb. 2, 1915.

Application filed February 7, 1911. Serial No. 607,071.

*To all whom it may concern:*

Be it known that I, GEORGE EVERSON, a citizen of the United States, residing at Detroit, in the county of Wayne and State of Michigan, have invented certain new and useful Improvements in Adding-Machines, of which the following is a specification.

The object of this invention is to provide an adding machine adapted to print numbers in a continuous column, add the numbers and print the total at the foot of the column in the same or a different colored ink, the mechanism at the same time being capable of manipulation to correct a mistake in any number before the same is printed, and to repeat any number without the necessity for operating the several keys corresponding to the several digits of that number.

A further object of the invention is to provide a simple and compact mechanism for performing the several operations, so constructed as to obviate the necessity for springs or other parts which are liable to break or get out of order and employing a single row of nine keys representing digits, to write any number containing ten figures or less, the machine being thus made simple to operate and the liability of making mistakes being reduced to the minimum.

Figure 1:
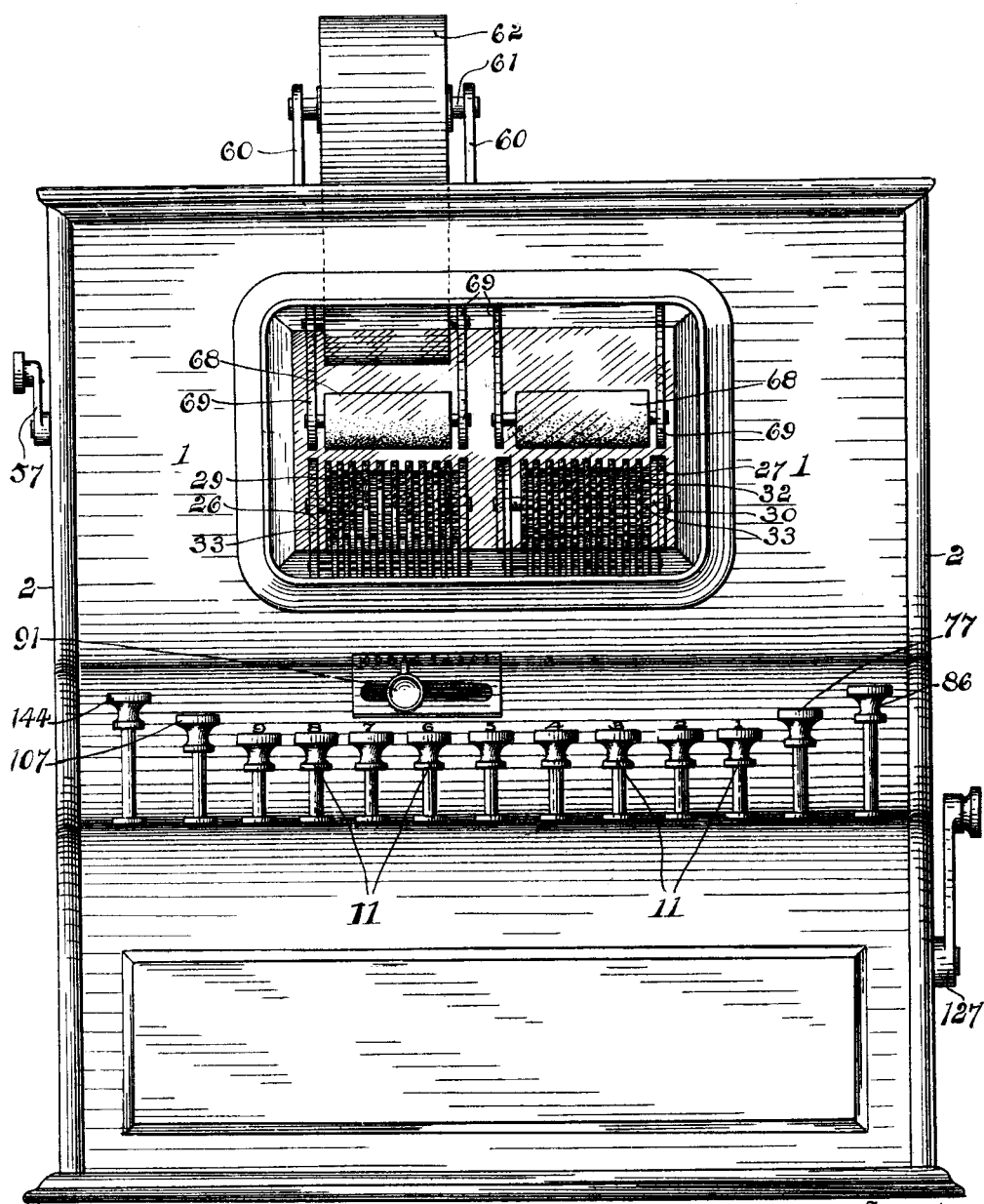
Figure 2:
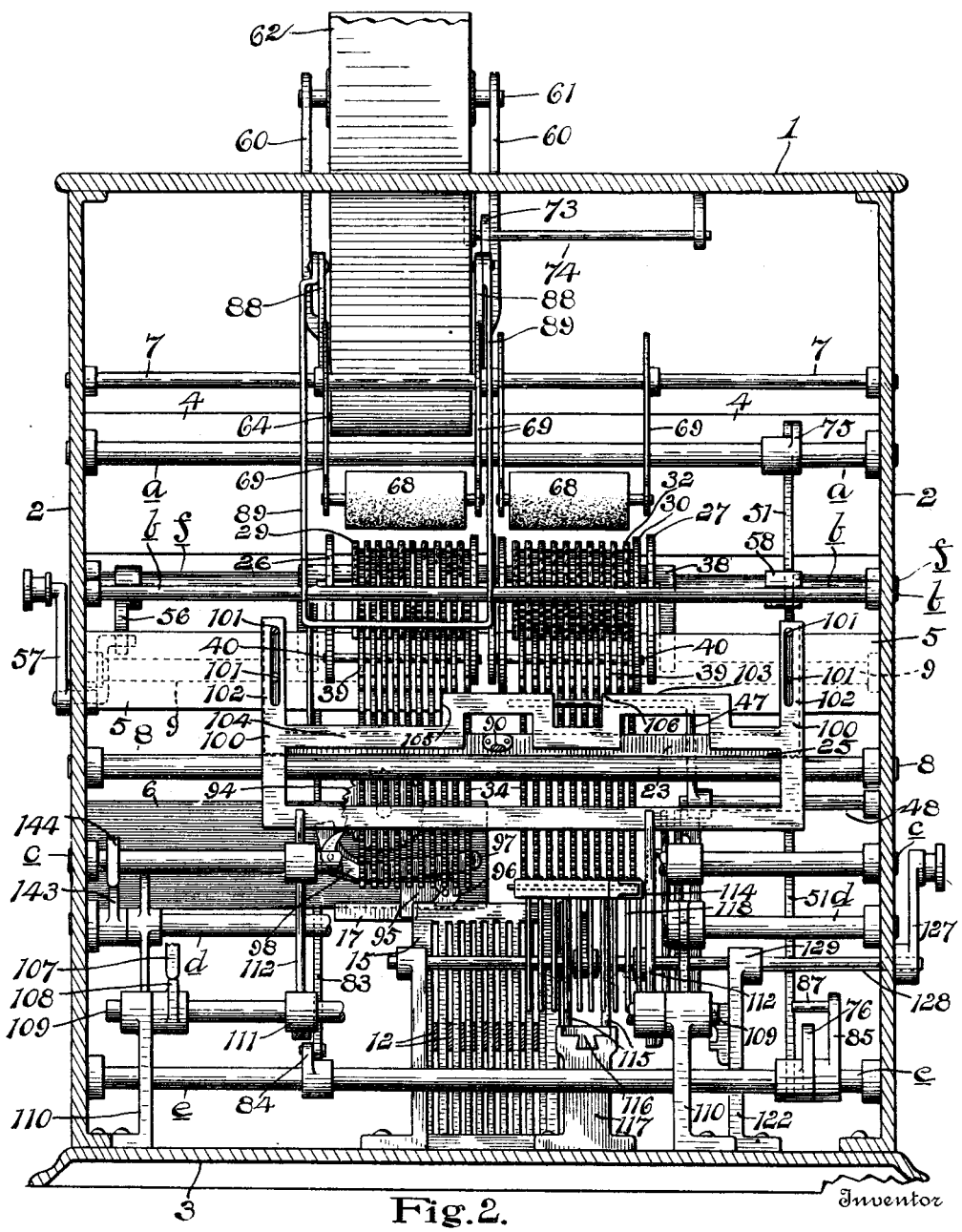
Figure 3:
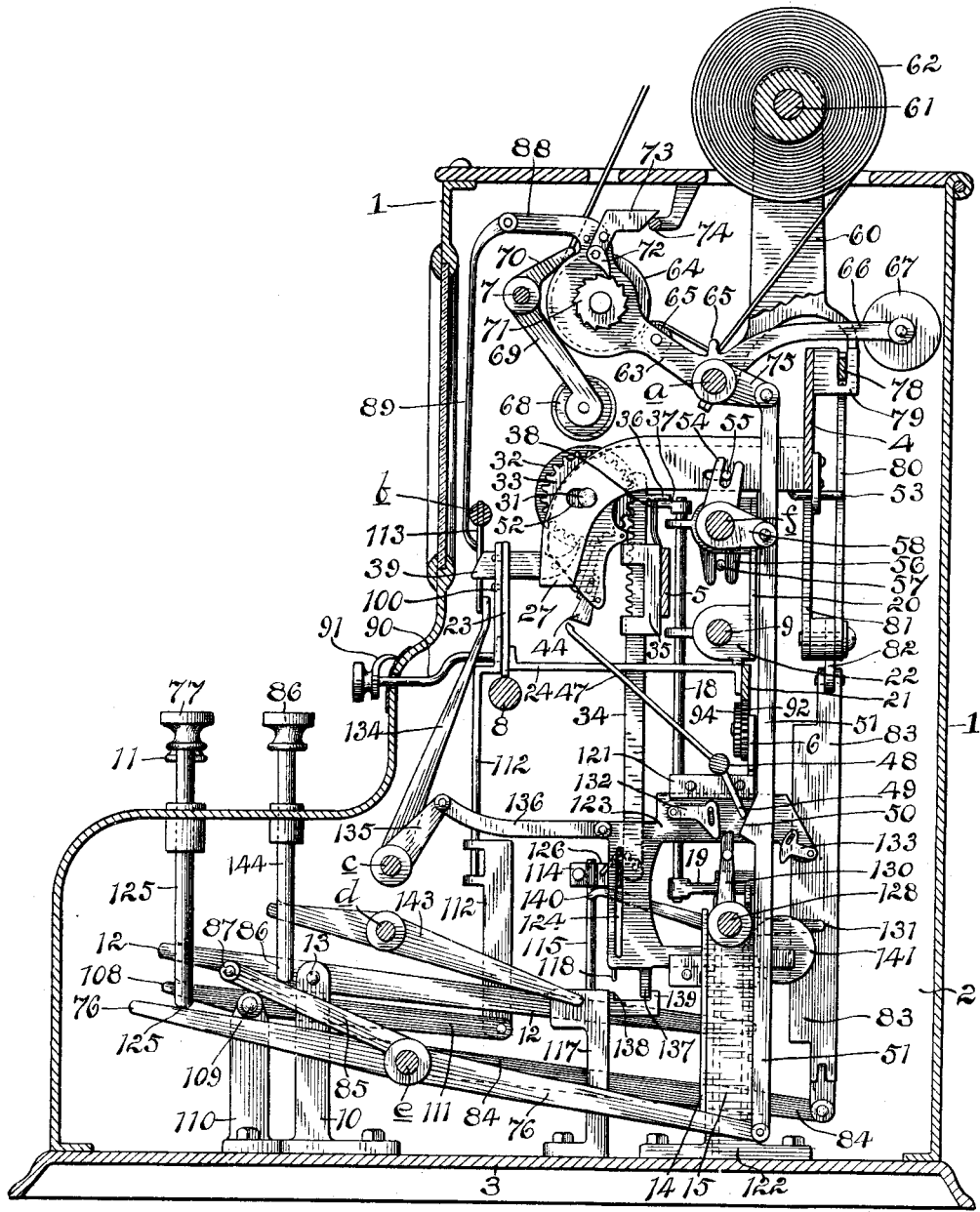
Figure 4:
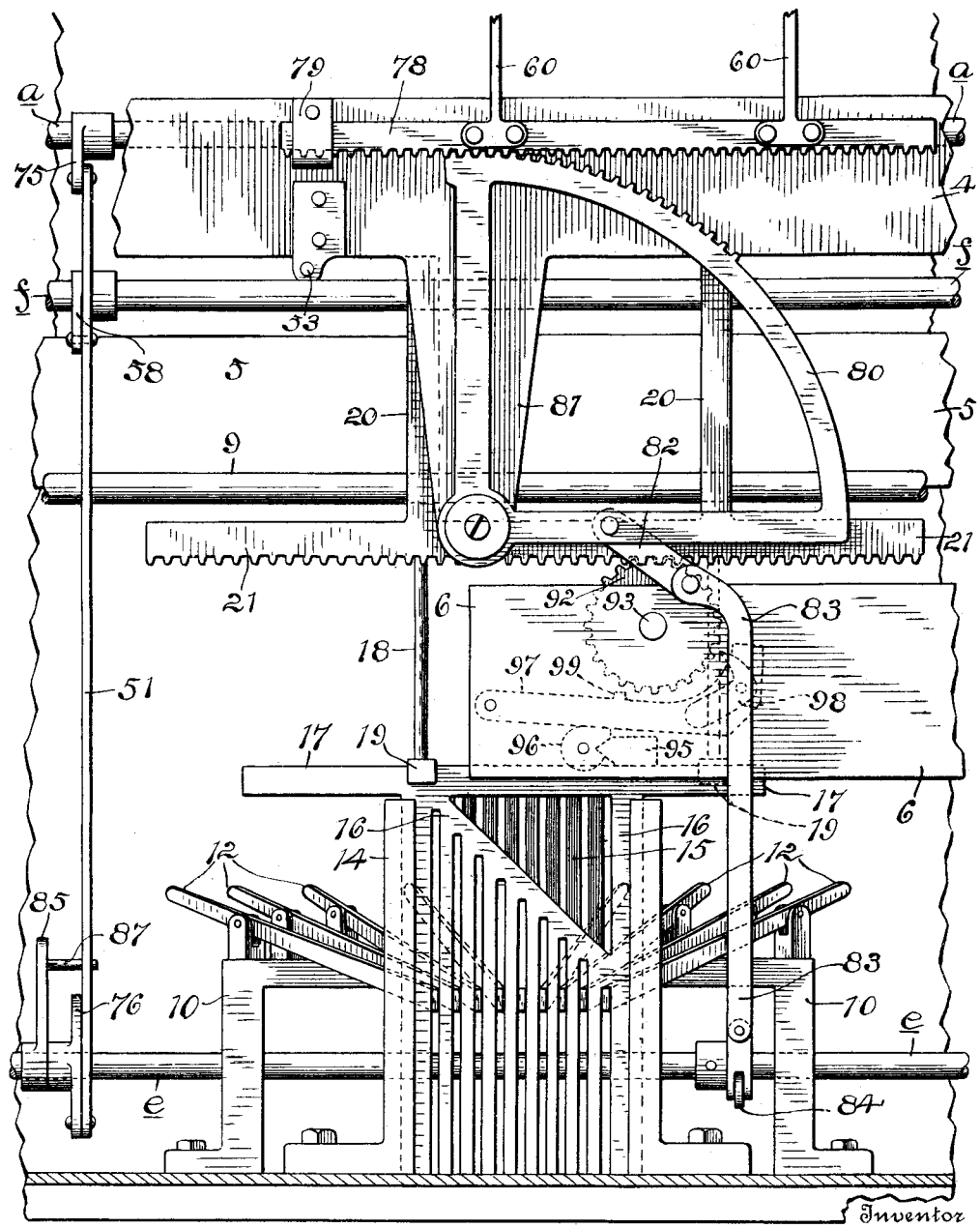
Figures 8, 9:
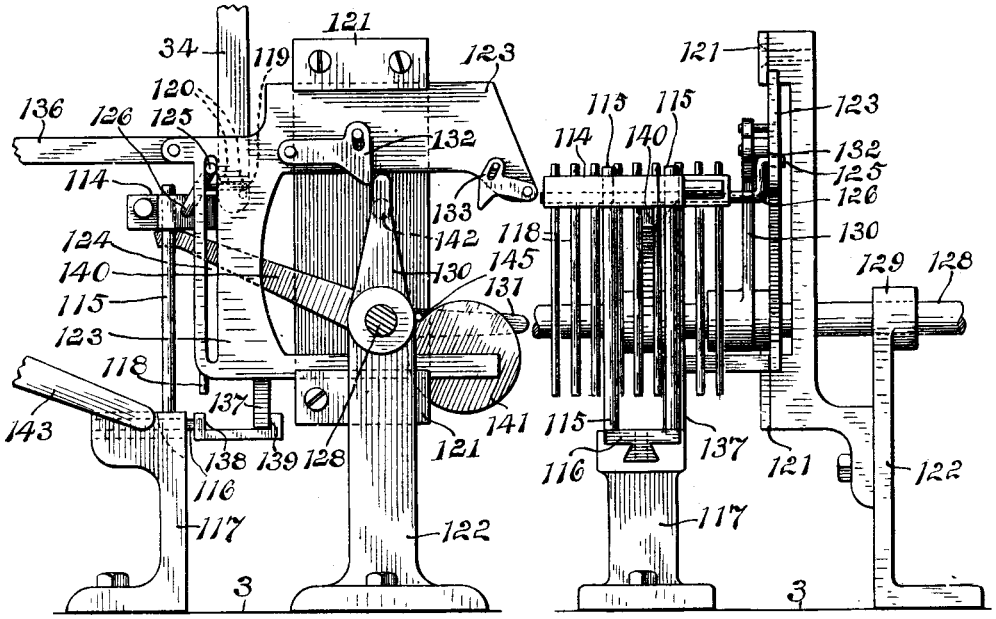
Figures 10, 14, 15:
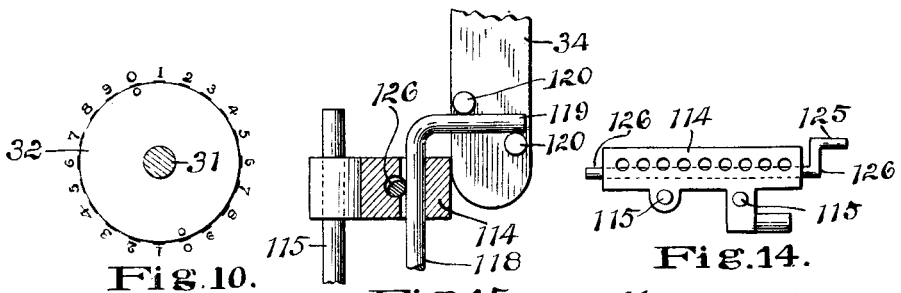
Figures 11, 12:
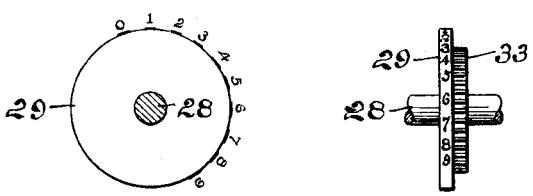
Figure 13:
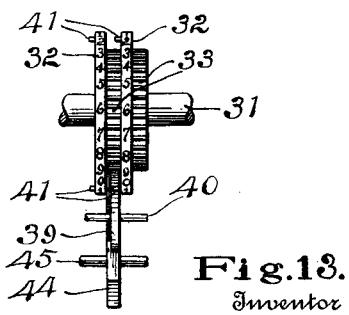
Figure 20:
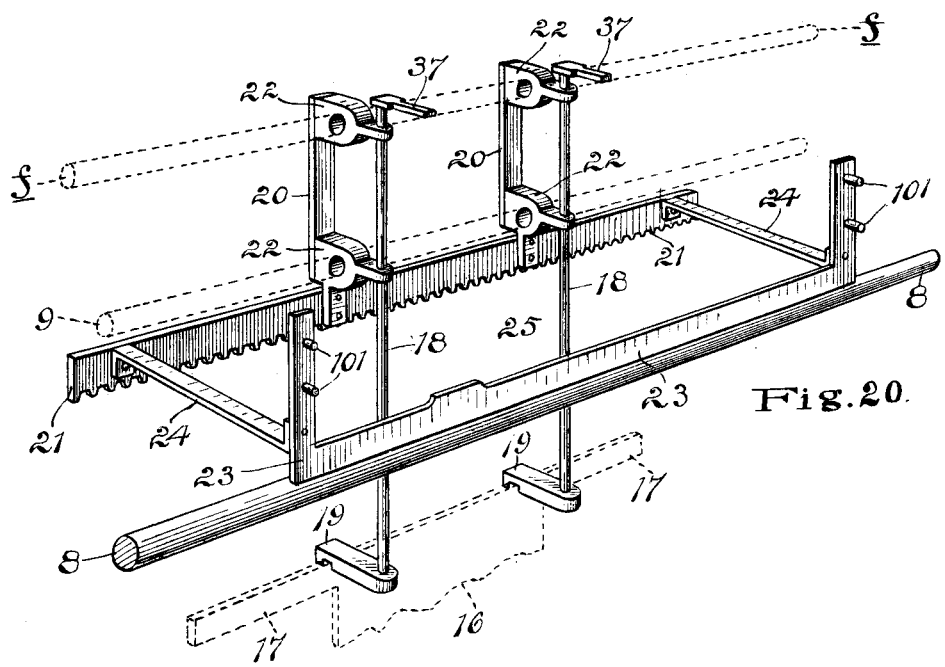
Figure 21:
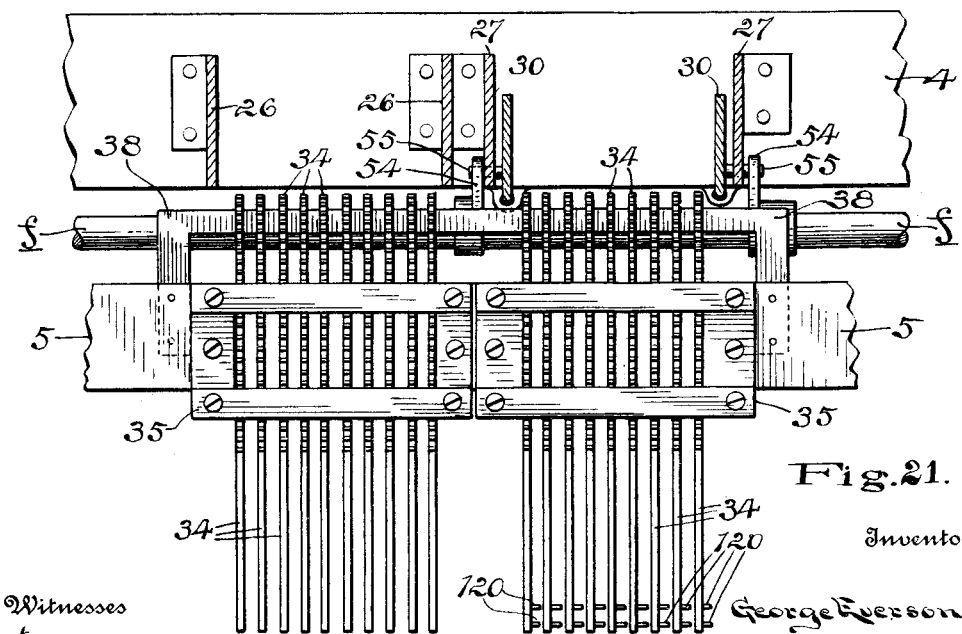

It is also an object of this invention to provide certain other new and useful features in the operation and the construction and arrangement of parts, all as hereinafter more fully described, reference being had to the accompanying drawings in which, Figure 1 is a front elevation of a machine embodying the invention; Fig. 2, a longitudinal vertical section through the casing of the same showing the mechanism in elevation with parts broken away to show the construction; Fig. 3 is a vertical cross section through the casing adjacent to one end thereof; Fig. 4 is an enlarged detail showing portions of the mechanism in rear elevation; Fig. 5 is a sectional detail showing the dial operating and the printing mechanisms; Fig. 6 is a detail of certain features of carriage shifting mechanism, in normal position; Fig. 7 is a similar view showing the same in operated position; Fig. 8 is a detail showing features of repeating mechanism in side elevation: Fig. 9 is a front elevation of the same; Fig. 10 is a diagrammatic view of one of the adding wheels; Fig. 11 is a similar view of one of the number or column wheels; Fig. 12 is a face view of the same; Fig. 13 is a similar view of two of the adding wheels; Fig. 14 is a detail plan view of a rod guide or head; Fig. 15 is an enlarged cross-sectional view of the head showing the manner of binding the rods therein; Fig. 16 is a detail view of the slotted guide plate; Fig. 17 is a horizontal section through the guide plates and their supporting bracket; Fig. 18 is a horizontal section through the two sets of counting wheels and adjacent parts; Fig. 19 is a view similar to Fig. 8, showing the parts in operated position; Fig. 20 is a perspective view of the carriage; and Fig. 21 is a section on the line $x$—$x$ of Fig. 5 showing the guides for the rack bars.

As shown in the drawings, the numeral 1 indicates any suitable casing having end walls 2 and a base 3 upon which the end walls and parts of the mechanism are supported. Stationary cross bars 4, 5 and 6 and stationary cross rods 7, 8 and 9 are secured to and supported by the end walls of the casing to support the operating mechanism. Rotatable shafts $a$ $b$ $c$ $d$ $e$ and $f$ are journaled in the end walls to actuate various parts of the mechanism.

Secured to the base 3 near the front of the casing is a bracket 10 upon which a series of counting levers 12, nine in number, are journaled as indicated at 13 and are actuated by a corresponding series or bank of nine counting or digit keys 11 which are numbered from 1 to 9 inclusive, reading from right to left. A bracket 14 is also secured to the base near the rear of the casing, to which bracket is secured a stationary slotted upright plate 15 (shown in detail in Figs. 4 and 16), through the slots of which the inner ends of the counting levers project and are guided in their vertical movement when their forward ends are depressed by the operation of said keys. The bracket 14 is also provided with guide ways in which a plate 16 is vertically movable, said plate being provided with slots of graduated lengths through which the ends of the levers also project. This vertically movable plate 16 is provided at its upper end with a transverse bar 17 upon which are mounted vertical spindles or rods 18 having shoes 19 secured to their lower ends to engage and slide upon the upper edge of said bar; said spindles being laterally movable along said bar. Upon the rotatable shafts and fixed rod 9 are mounted hangers 20 having laterally extending arms 22 provided with guide openings through which said spindles 18 project and are free to move vertically. Said hangers are movable longitudinally of said shaft and rod and a horizontally extending rack bar 21 is secured to their lower extremities. Secured to said bar 21 by laterally extending connecting bars 24 is a U-shaped bar 23 with its lower edge preferably resting upon and supported by the cross rod 8 (see Fig. 20) and free to slide thereon longitudinally of the rod. The hangers 20, bar 21 and connected bar 23 form a laterally movable carriage 25 for carrying the vertically movable push rods 18 and other parts of the mechanism.

Secured to the fixed cross bar 4 are brackets 26 and 27, said brackets 26 carrying a fixed spindle 28 upon which are mounted a series of ten independently rotatable column or number dials 29 each having raised numerals on its periphery reading from 0 to 9 inclusive serving the purpose of type for printing any number composed of ten figures or less, the first dial at the right of said series representing the units, the second tens, the third hundreds, etc. Between the two brackets 27 are forwardly and rearwardly movable brackets 30 and these movable brackets carry a fixed spindle 31 upon which is mounted a series of ten rotatable adding dials or wheels 32 also provided with raised numerals upon their peripheries for the purpose of printing any number containing ten figures or less, said dials also corresponding to the units, tens, hundreds, thousands, etc., place in the number, reading from right to left.

Each of the dials 29 and 32 in both sets is provided with a gear 33 secured thereto to turn the dial, having teeth corresponding in number to the number of figures on said dials and each gear is adapted to be engaged and operated by a rack bar 34 held and guided in its vertical movement by suitable guides 35 (shown in Figs. 5 and 21) secured to the fixed supporting bar 5. Each rack bar 34 is provided near its upper end with an arm 36 projecting rearwardly into the path of a forwardly extending arm 37 on the upper end of each of the vertically movable rods 18 which are shiftable laterally with the carriage 25 to bring said arms 37 into alinement with any one of the arms 36 on the several rack bars and lift the same to turn the corresponding dial when said rods 18 are raised by the lifting of the plate 16. A yoke 38 is secured to the upper edge of the cross bar 5 to engage the under side of the arms 36 and limit the downward movement of said rack bars, said yoke normally supporting the bars with their arms in position to be engaged by the arms 37 when the rods 18 are in lowered position, the arms 37 passing freely below the arms 36 when the carriage 25 is shifted. Said rods 18 are so spaced apart with reference to the two sets of dials that when one dial in one set is turned through the medium of one of said rods the other rod will cause the corresponding dial in the other set to be simultaneously turned a like distance.

When one of the digit keys 11 is depressed, a dial in each set of dials will be turned a distance corresponding to the digit which that key represents, through the medium of the plate 16 having the slots of graduated lengths. The levers 12 operated by said keys and engaged with said slots, all have the same length of movement and all lie at the lower ends of their slots when at rest, therefore when the key representing the digit 1 and actuating that one of the levers 12 which projects through the slot of greatest length, is actuated, said lever will have a long idle movement in said slot and will not engage the upper end of said slot until it has nearly reached the upper limit of its movement. The plate will therefore be lifted but a short distance by the lever and the dials will be turned but one space or number. The slot engaged by the lever which is actuated by the key representing the digit 2, is just enough shorter so that the plate will be lifted just far enough to turn the dials opposite which the rods 18 are placed, two spaces or numbers, and each succeeding lever is engaged with a slot of correspondingly lesser length, the lever actuated by the key marked 9, engaging the shortest slot so that the plate will be given the greatest movement by said lever and will turn the dials nine spaces.

When any of the dials are turned forward a certain distance by the upward movement of their rack bars 34, said dials are held in the position to which they are turned by a series of weighted pawls 39 (see Fig. 5) which engage the forward side of the gears on the dials and are mounted upon rods 40 carried by the brackets upon which the dials are supported. The adding dials 32 which print the totals of the several columns of figures printed by the dials 29, are each provided with diametrically disposed pins 41 extending laterally therefrom over the periphery of the gear 33 on the adjacent dial to the left and pivotally supported upon a rod 42 carried by the brackets 30 is a series of gravity pawls 43, one for each dial, located in the path of said pins 41 to be engaged and released thereby from engagement with gravity pawls 44 mounted upon a rod 45 on said brackets, said rod 45 passing through elongated slots 46 in said pawls. The normal position of the pawls 44 is that shown in Fig. 5, the same being held in raised position by the small pawls 43, and they fall down with their supporting rod 45 engaging the upper end of their slots 46, only when released by the engagement of one of the pins 41 with the pawls 43. When any one of said actuating pawls 44 is so lowered, its upper end is in position to engage the gear 33 above and turn the same one tooth when said pawl is lifted by means hereinafter described. The trip pins 41 on each dial are so positioned relative to the numerals on the periphery of said dial, that when the dial is turned far enough to bring either one of the numerals 9 into printing position, one of its pins will engage the pawl 43 holding the pawl 44 for actuating the dial next to the left, and permit said actuating pawl to fall so that when the printing mechanism hereinafter described, is actuated to print from the figures on the several dials which have been turned into printing position, said pawl will be lifted and turn its dial one space or number.

The several actuating pawls 44 which have been released during the actuation of the several dials to add any particular number to the amount previously indicated on the dials, are simultaneously lifted by a rod 47 (see Figs. 2 and 3) having a horizontal portion extending beneath the lower ends of said pawls to be swung into engagement therewith when the shaft 48 upon which the rod is mounted, is turned by an arm 49 secured thereto, which arm is actuated by a cam projection 50 on a vertically extending actuating bar 51 for actuating the printing mechanism. Said cam is so arranged that the first movement of the bar 51 will turn the lifting rod 47 and raise the pawls, thus turning the dials actuated thereby, before the printing mechanism is brought into operative position.

The column or number dials 29 are employed in printing the several numbers which are added together by the adding dials 32, the totals only being printed by the adding dials. Each number to be added is separately indicated on the number dials and after printing each number the dials are turned back to "0" by the weight of the several rack bars 34 in engagement with the gears 33 when said gears are released by the pawls 39. When certain digit keys are depressed to turn the dials 29 and indicate thereon the desired numbers, the corresponding dials 32 are also turned the same distance, but as said adding dials are to indicate the total, they are successively turned in one direction as one number after another is printed and are not permitted to turn backward until after the total is printed by them. The forward turning of each adding dial ten figures or spaces, causes the next dial to the left to be turned one space through the medium of its pawl 44 (see Figs. 5 and 13) which is released by one of the pins 41 on the dial turned, coming into contact with the dog 43, and which pawl is permitted to fall into position to engage a tooth of the gear on said wheel to the left, when said pawl is again raised by the rod 47 which is actuated when the printing mechanism is thrown into operative position to print the number indicated on the number dials or the total on the adding dials.

The adding dials 32 are released from their rack bars 34 so that they will be free to turn when released by the pawls 39, by moving the brackets 30 upon which said dials are mounted, forwardly upon the brackets 27. The shaft 31 upon which the adding dials are mounted passes through slots 52 (see Fig. 3) in the fixed brackets which slots form bearings for the shaft to support the forward end of the movable brackets and the rear ends of said brackets are supported by rearwardly extending pins 53 thereon engaging bearings on the cross bar 4. The said brackets are so moved by forked arms 54 on the rotatable shaft $f$ adjacent to the sides of the brackets 27 which are formed with slots for pins 55 on the movable brackets engaged by the forked ends of the arms 54. The shaft $f$ may be turned to actuate the arms 54 and shift the adding dials forward or back, by a forked arm 56 (see Fig. 2) on said shaft near one end wall of the casing engaged by a crank 57 extending through said wall and adapted to be manually operated (see Figs. 3 and 5). Said shaft is also turned and other adding dials moved out of operative position whenever the bar 51 actuating the printing mechanism is operated, by providing an arm 58 on the shaft $f$ which is pivotally attached to said bar. The gears 33 on the adding dials are thus disengaged from their rack bars 34 after each printing operation, and thus said rack bars are permitted to fall into position upon the yoke 38 to be engaged by the arm 37 on the rod 18 and again lifted thereby to further turn their dials. The adding dials are held from turning when so released from their rack bars, by the pawls 39 which are carried on the movable brackets 30 and are thus moved forwardly with the dials. These pawls are operated to release the dials when the totals are printed therefrom, by means hereinafter described, and when so disengaged from the rack bars and released by the pawls, said adding dials will be turned back to "0" by gravity, their gears 33 being weighted at one side as indicated at 59 in Fig. 5.

The printing mechanism shown in detail in Figs. 3 and 5 comprises a frame or carriage 60 mounted upon the shaft $a$ to slide longitudinally thereon and has upwardly extending bracket arms carrying a shaft 61 for a roll of paper 62 upon which the columns of figures and totals are adapted to be printed. Pivoted upon the shaft *a* and movable thereon with the carriage, is a frame 63 carrying a printing roll 64 and also suitable tension guides 65 over which the strip of paper is led from the roll 62 to the printing roll. This pivoted frame is preferably provided with a rearwardly extending arm 66 having a counter weight 67 to balance the weight of the printing roll. Above each set of dials is an inking roll 68 carried by a swinging bracket 69 mounted upon the shaft 7 and so located relative to the printing roll that when the frame carrying said roll is swung downward, it will engage and swing the bracket 69 opposite which it is stationed at the time of actuation, and cause the inking roll to come into contact with the type of the dials and ink the same just before the printing roll brings the strip of paper into contact therewith. Upon the upward movement of the printing roll, the inking roll is swung back to inoperative position by the engagement of the frame 63 with an arm 70 on the bracket 69 extending laterally therefrom over the forward end of the frame. If desired, the inking rolls may be provided with different colored inks so that the totals may be printed in one color and the column of numbers in another.

To move the strip of paper one line each time a number is printed thereon, the shaft of the printing roll is provided with a ratchet wheel 71 engaged by a pawl 72 carried by one end of an arm 73 pivoted intermediate its ends upon the frame 63. On the top of the casing 1 is secured a horizontally extending rod 74 in such a position that when the frame carrying the printing roll is swung upward, the arm 73 will engage with the rod and turn said arm, bringing the pawl into engagement with the ratchet and turning the printing roll one space. The frame 63 is turned upon the shaft *a* to swing the printing roll into contact with the dials, by an arm 75 (see Fig. 3) on said shaft pivotally connected to the upper end of the actuating bar 51 which is moved upwardly by the printing lever 76 loosely mounted intermediate its ends upon the shaft *e* with one end pivotally connected to the lower end of the bar 51 and its opposite end engaged by a column or number printing key 77.

Normally, the frame 63 stands in position to bring the platen or printing roll into engagement with the column or number dials 29 when actuated by the key 77, but when it is desired to print the total of the column, the frame is shifted upon the shaft *a* to bring the platen roll and its strip of paper opposite the adding dials 32. This shifting movement is accomplished by securing to rearwardly extending arms on the carriage 60, a rack bar 78 (see Fig. 4) which is guided in ways 79 upon the cross bar 4, and this bar is engaged by a segmental gear 80 pivotally secured to a downwardly extending bracket 81 on said cross bar. A link 82 pivotally connects a vertically movable actuating bar 83 eccentrically to the segment to actuate the same and the lower end of said bar is pivotally attached to the rear end of a lever 84 which is secured at its forward end to the shaft *e* to turn therewith. Secured to the shaft *e* to turn the same is a short lever arm 85 (see Fig. 3) engaged by a total printing key 86 and on said arm is a pin 87 extending laterally over the forward end of the lever 76 adapted to engage and actuate said lever after the shaft *e* has been turned far enough to actuate the segment 80 through the medium of the lever 84 and bar 83, and shift the carriage 60. Further downward movement of the key 86 actuates the lever 76 through the medium of the said pin 87 and the frame carrying the printing roll is thus turned to bring the roll into engagement with the dials 32 after the carriage has been shifted to bring the roll opposite said dials, the depressing of the single key 86, performing the work of both shifting the carriage and moving the roll into printing contact with the dials. The bar 83 is weighted as shown in Fig. 3 so that when the key 86 is depressed to shift the carriage and print the total, the segment will be turned back by the weight and automatically shift the carriage back to position opposite the column dials.

Upon the pivoted frame 63 carrying the platen 64, are two forwardly extending arms 88 (see Figs. 2 and 3) to the forward ends of which is pivoted a hanging bail 89 with its horizontal portion at the lower end of the bail normally lying in the vertical plane or the forward inclined ends of the pawls 39 which pawls engage the gears 33 and hold the dials in the position to which they are turned by their rack bars 34. When said frame is turned to lower the platen and print a number upon the paper strip from the numerals just previously turned up on the dials 29, the bail will pass below the ends of said pawls holding said dials, and upon the return or upward movement of the frame, the bail will engage and lift said pawls releasing the dials and permitting them to be turned back to 0 by the weight of their rack bars hanging thereon. After each operation of the printing mechanism to print a number, said dials 29 are thus automatically released and turned back to 0, and when the carriage is shifted and a total printed from the dials 32, said adding dials will in a like manner be released, the bail being shifted with the carriage into position to engage the pawls holding said dials, and said dials will, by reason of their weighted sides 59, turn back to 0 also.

The carriage 25 which carries the lifting rods 18 for actuating the rack bars 34 and turning the dials, may be shifted to bring said rods into position to actuate any one of the dials of each set, by an arm 90 (see Fig. 3) rigidly secured to the bar 23 at one end and extending outward through a slot in the front of the casing at its opposite end when it is provided with a head or handle 91 having an index pointer movable over a horizontal line of ten numbers reading from right to left and corresponding to the ten dials of each set, (see Fig. 1) and likewise representing ten vertical rows of figures or the units, tens, hundreds etc. place in any number. By moving the index to "3", the third dial from the right in each set of dials, will be turned when one of the keys 11 is depressed and to automatically move the carriage successively one step or place at a time to the right from the place at which it is set by means of the handle 91, a gear 92 (see Figs. 4, 6 and 7) is pivotally supported upon a stud bolt 93 on the bar 6 in engagement with the rack bar 21 of the carriage 25. This gear is turned one tooth to move the carriage one place, each time one of the keys 11 is operated and the slotted plate 16 lifted thereby, by a ratchet wheel 94 on the stud 93 secured to the gear and a dog 95 on said plate to engage a cam 96 pivotally supported on the bar 6 at a distance below the ratchet wheel and adapted to be turned by the dog as it passes the cam on the upward movement of the plate, into engagement with the lower side of a bar 97 pivoted at one end to the supporting bar 6 and carrying a weighted pawl 98 at its opposite end. The turning of the cam 96 lifts the bar 97 bringing the pawl 98 and a lug 99 on the bar into engagement with the ratchet and turning the same one notch, the lug locking the wheel against further movement in either direction until the bar is released and permitted to fall. The cam is so formed as to lock the bar in raised position until the return or downward movement of the plate 16 when the dog 95 again comes into contact with the cam and turns the large side thereof away from the bar.

In the operation of the machine to record and add a series of numbers, the operator first moves the carriage 25 by means of the handle 91, (see Figs. 1 and 3) bringing the index finger thereon opposite the numeral indicating the place in which the last figure to the left in the number to be written, stands; or, for instance if the number be 542, the index would be moved to the figure "3" indicating the third or "hundreds" place. He would then strike the key 11 which is marked "5" and thereby turn the third dial in each set of dials five spaces or numbers. The keys marked "4" and "2" would then be struck in succession, the carriage moving automatically one space to the right each time a key is struck.

If in writing a given number, the operator should strike a wrong key, the mistake may be corrected if it is discovered before the printing key is operated to print the number shown on the number dials 29 and if he compares the figures turned up on these dials by looking at them through the opening in the front of the casing with the figures of the number he desires to record, each time before operating the printing key, the liability of mistakes will be reduced to the minimum. The correcting of a mistake in a number turned up on the dials is accomplished by lifting certain of the pawls 39 and releasing the corresponding dials, permitting said dials to be turned backward by the weight of their rack bars 34 which have just been previously raised in turning up the wrong number on the dials. For example, suppose that the dials 29 show the number 12562 and the number which the operator intended to record is 13562, before pressing the printing key, he will move the index 91 to "4", thus moving the carriage and bringing the lifting rods 18 thereon opposite the fourth dial from the right in each set. A lifting bar 100, shown in Figs. 2, 3 and 18 is attached to the U-bar 23 of the carriage by pins 101 on the upwardly extending arms of said bar 23 engaging vertical slots in corresponding arms 102 on the lifting bar and thus said lifting bar is supported by the carriage 25 to move therewith directly beneath the forward ends of the pawls 39. The portion of the lifting bar beneath the pawls for the dials 32 is offset laterally as shown in Fig. 18 at 103, and the pawls for the dials 29 are preferably made a little longer than the pawls for the dials 32 so that the straight portion 104 of said bar will extend beneath them outside the ends of the shorter pawls. Both the offset and straight portions of the bar are formed with upwardly bent portions lying some distance above the horizontal plane of the upper edge of the main part of the bar and forming right angle shoulders 105 and 106 located relative to the lifting rods 18 on the carriages so that when said carriage is moved by the operator as above described in making a correction, said shoulders will be in position to engage the pawls holding those dials opposite which said rods are positioned. Owing to the upward bends in the bar and the offset therein, only these pawls and those to the left of them in each set will be lifted when the bar is raised by means of a correcting key 107. Said correcting key engages a lever 108 fixed upon a rock shaft 109 (see Fig. 3) mounted in suitable bearing brackets 110 on the bed of the casing and secured upon said shaft near each end of the lifting bar 100 is a rearwardly extending arm 111 each pivotally connected at its free end to a vertically extending lifting rod 112 which rods are loosely engaged at their upper ends with said bar 100 to lift the same evenly at each end.

In correcting the number given in the above example, after the operator has moved the carriage to bring the lifting bar 100 in position to lift the pawl holding the fourth dial or the one which was not turned far enough, he will press the correcting key and thus release the first four dials from the right of each set. These dials will be turned backward by the weight of the rack bars hanging thereon until the arms 36 on said bars come into engagement with the stop yoke 38, or each dial will be turned backward, the same distance it has just been turned forward in indicating the number in which the mistake was made. As soon as the correcting key is released, the bar 100 will fall by gravity out of the way of the pawls 39 which will again engage their gears to hold the dials in the position to which they may be turned. The number dials 29 upon which the four figures 2562, of the number having thus been turned back to 0 and the corresponding adding dials having been also turned backward a like distance, the operator may again strike in succession the keys 11 marked "3" "5" "6" "2" and thus turn up the correct figures on the dials.

To facilitate the operation of the machine, mechanism is provided whereby any number may be repeated by the actuation of a single key, thus obviating the necessity for operating a key for each figure of the number each time the number is repeated. When the repeating mechanism is thrown into operation, the bail 89 is held out of the path of the pawls 39 by a swinging arm 113 (see Fig. 3) on the shaft $b$, said bail sliding up and down on said arm as the printing rod is raised and lowered to repeatedly print the number, without releasing the dials which are thus held by said pawls with the same number turned up thereon in printing position.

In order that the number be added upon the adding dials each time it is repeated, it is necessary to turn the same dials the same distance each time, and to accomplish this, means is provided for simultaneously lifting the several rack bars of these dials the desired distance, comprising (as shown in Figs. 8, 9, 14, 15 and 19) a head block 114 slidable up and down upon two vertical posts 115 carried by a slide 116 mounted in a suitable guideway in the upper end of a bracket 117 on the base 3 to slide horizontally in said way, said head block being provided with a series of holes therethrough for a series of nine spindles 118, one opposite each of the rack bars 34. Normally these spindles hang upon the lower ends of said bars by means of laterally bent upper ends 119 engaged between two laterally extending pins 120 on the lower end of each bar, and said spindles slide freely through their guide openings in the head block as the rack bars are raised and lowered to turn the adding dials in the ordinary operation of the machine.

Movable forwardly and rearwardly in suitable guide ways 121 (see Figs. 8, 9 and 19) on a bracket 122 secured to the base, is a vertically disposed plate 123 having a vertical slot 124 near its forward end engaged by one end of a crank arm 125 on the end of a cam rod 126 extending horizontally through an opening in the head block 114 at one side of the spindles 118. The cam rod is formed oval in cross section (see Figs. 14 and 15) and the hole in the block through which it extends cuts into one side of the vertical holes for the spindles so that when turned into one position by its crank 125, its enlarged side will engage the sides of the spindles and lock the same within the block in any position to which they may be lifted at the time of the turning of said cam rod.

The plate 123 is moved forward and back in its guide ways by means of a repeating crank 127 (see Fig. 2) secured upon the end of a shaft 128 outside the casing, said crank being provided with a handle by means of which it may be turned by the operator. This shaft is mounted in bearings upon the bracket 122 and a bracket 129, shown in Fig. 2, and is provided with crank arms 130 and 131 secured thereon to engage dogs 132 and 133, (see Fig. 8) respectively, pivotally attached to the said plate. Upon forward movement of the arm 130 it will strike the dog 132 and move the plates forward the limit of its movement, then pass the dog and continue on downward, the other arm 131 passing its dog 133 which is pivoted to the plate to permit said arm to raise it and pass by during the forward turning of the same. Upon the return or rearward turning of the arms, the arm 131 will engage the dog 133 and move the plate back, the arm 130 passing its dog 132 during such turning.

When the plate 123 is moved forward by the turning of the shaft 128 as described, the cam rod 126, by reason of the engagement of its crank arm with the slot 124 of said plate will be turned and lock the spindles in the head block. The same movement of the plate also actuates a lever arm 134 on the shaft $c$ by means of an arm 135 on said shaft pivotally connected by a link 136 with the forward end of the plate. The upper end of the lever arm 134 engages the swinging arm 113 and thus when said repeating crank 127 is turned to throw the repeating mechanism into operation, the bail 89 is swung out of the path of the pawls 39 so that said pawls will not be lifted thereby while the repeating mechanism is operative.

Upon the plate 123 is a laterally and downwardly extending foot 137 (see Fig. 8) projecting into a transverse slot in the rear end of the slide 116 which slot forms a shoulder 138 at its forward side and a shoulder 139 at its rear side to be engaged by said foot. The movement or throw of the plate is slightly greater than the distance from the forward side of the foot to the shoulder 138 and thus when the plate is moved forward, said foot will engage and move the slide just before said plate reaches the forward end of its movement and after the spindles have been locked by such movement. The head block with its spindles being carried by the slide, when said slide is moved forward by the engagement of the foot therewith, the bent upper ends 119 of the spindles will be disengaged from over the lower pins 120 on the rack bars, but will not be moved from beneath the upper of said pins. The spindles are thus all disengaged from the rack bars after being locked in the head block and are free to fall with the block which slides upon the posts 115.

The head block is normally supported in raised position by an arm 140 loosely mounted upon the shaft 128 with its free end extending beneath the head block, said lever being formed with a counterweight 141 at the other side of the shaft to overbalance the weight of the head block. On the arm 130 is a pin 142 adapted to engage the arm 140 when said arm 130 is turned forwardly and after it has moved the plate 123 to the forward limit of its movement and released the spindles 118 from the rack bars. When said supporting arm 140 is forced to swing downward by the engagement therewith of the pin on the arm 130, the head block with its spindles locked therein will fall by gravity to the position shown in Fig. 19 with the rear end of a lever 143 secured upon the shaft $d$ directly beneath its forward edge in position to engage and raise the head when said lever is turned by means of a repeating key 144 engaging a forwardly extending arm on said shaft.

When the shaft 128 is turned backward to swing the arms 130 and 131 rearwardly and move the plate 123 to inoperative position, the weight 141 on the lifting arm 140 will raise the head and its spindle into normal position in which position they will be held by said arm which is locked against again turning until the shaft is turned, by a pin 145 on the arm 131 which engages the weight at the end of the movement of said arm. It will be noted that the lifting arm 140 is so arranged relative to the arm 131 that the head block will be fully raised before said actuating arm comes into engagement with the dog 133 to move the plate rearwardly and also that owing to the slot within which the foot 137 moves, the slide 116 will not be moved until just before the plate reaches the rear end of its movement when said foot will engage the lug or shoulder 139 at the rear end of the slide. The spindles 118 are therefore unlocked and fall through the head with their bent ends engaging the upper side thereof before said head is moved rearwardly by the rearward movement of the slide.

The operator, desiring to repeat a certain number say 17846, first operates the machine in the usual way to turn up that number on the dials, by moving the indicator 91 to fifth place or "5" and then striking in succession the keys 11 marked "1," "7," "8," "4," "6." This will raise the rack bars 34 of the first five dials in each set to different heights to turn the several dials the number of spaces corresponding to the figures of the number 17846 and that number will show upon the number dials 29. Before actuating the printing key to print the number, however, he will turn the repeating crank 127 forward. This will move the plate 123 forward and first lock the spindles 118 in the head 114, then withdraw them from engagement with their rack bars 34, permitting them to fall with the head. It will be borne in mind that these spindles were hanging upon the rack bars when said bars were raised by the actuation of the keys 11 and that said bars and spindles were still held at different heights by the engagement of the bars with their gears on the dials, when the operator turned the repeating lever and moved the plate 123. The first five spindles from the left in the series will therefore be locked in the head 114 in raised position, that is, with their upper bent ends away from the upper side of the head, when the repeating crank is turned, and at the same time the forward movement of the plate 123 will swing the bail 89 out of the path of the pawls 39 so that said pawls will remain in engagement with their gears and those for the dials 29 will hold said dials from turning, thus permitting the printing mechanism to be repeatedly operated to print the number from said dials any desired number of times.

With the parts in the position described, the operator then presses the printing key, the operation of which not only brings the printing rollers into engagement with the dials 29 to print for the first time the number which is to be repeated, but also moves the dials 32 forward by turning the shaft $f$ as before described, disengaging their rack bars from their gears and permitting said bars to fall into engagement with the supporting yoke 38. The dials 29 being held with the same number still turned up thereon, to repeat the number it is only necessary to lift the five rack bars of the adding dials, the same distance as before and again "add" the number on the adding dials, before again actuating the printing key. This is accomplished by pressing the repeating key 144 which will lift the head 114 with its spindles held at different heights therein, to bring the upper bent ends of said raised spindles into engagement with the upper of the pins 120 on the rack bars and lift said bars a distance equal to the height at which the spindles are locked in the head. The operator will then again press the printing key to print for the second time the number from the number dials and to release the rack bars of the adding dials which were just previously raised by the actuation of the printing key. By repeatedly operating the repeating and printing keys, the number may be repeated any desired number of times as long as the repeating lever 127 remains turned forwardly to hold the repeating mechanism in operative position.

When the repeating lever 127 is thrown backward to move the repeating mechanism into inoperative position, the head block 114 with its spindles is raised and the spindles are unlocked and fall with their bent upper ends resting upon the top of the head, as before described. When the rack bars 34 are released from their gears they fall into engagement with the supporting yoke 38 and are thus supported with the space between the pins 120 on each, in direct alinement with the upper bent ends 119 of the spindles 118 when said spindles are unlocked, and thus when the foot 137 on the plate 123 strikes the shoulder 139 and moves the slide 116 rearwardly, said bent ends of the spindles are reëngaged with the pins 120. The spindles are thus re-attached to the rack bars to move therewith.

What I claim is:—

1. In an adding machine, the combination of a series of rotatable dials having printing devices upon their faces, means for actuating said dials in a forward direction, pawls for holding said dials from backward rotation, printing mechanism movable toward said dials, and means carried by said mechanism for engaging and releasing said pawls when said mechanism is actuated to permit the backward turning of said dials.

2. In an adding machine, the combination of a series of rotatable dials having printing devices on their faces, means for actuating said dials in a forward direction, printing mechanism comprising a pivoted frame adapted to swing toward said dials and print from the devices thereon, and means for preventing the backward turning of said dials actuated by the swinging of said frame away from said dials to release the dials and permit the same to turn backward.

3. In an adding machine, the combination of a series of rotatable dials having printing devices upon their faces, means for actuating said dials in a forward direction, pawls for preventing the backward rotation of said dials, printing mechanism comprising a pivoted frame adapted to swing toward said dials to print therefrom, and a member carried by said frame to simultaneously actuate said pawls to permit the dials to turn backward.

4. In an adding machine, the combination of a series of rotatable dials having printing devices upon their faces, means for actuating said dials in a forward direction, gravity pawls for preventing the backward rotation of said dials, printing mechanism comprising a pivoted frame adapted to be swung toward said dials to print therefrom, and a swinging bail carried by said frame adapted to engage and lift said pawls upon the return swinging movement of the frame.

5. An adding machine comprising rotatable dials numbered upon their faces, pawls to hold said dials from rotation in a backward direction, mechanism to disengage said pawls, additional pawls to rotate said dials step by step, locking means for said additional pawls, means on the dials for operating the locking means to unlock the pawls, and means for actuating said additional pawls.

6. An adding machine comprising rotatable dials numbered upon their peripheries, a pawl for each dial adapted to engage and turn the same one step at a time, means for locking said pawls against operation, means carried by said dials for operating said means to unlock said pawls, and key operated means for actuating said released pawls to turn the dials.

7. An adding machine comprising rotatable dials numbered upon the peripheries, a gravity pawl for each dial to turn the same step by step, a dog for each pawl to hold the same in raised position, means located upon the dials relatively to the numbers thereon to operate the dogs and release the pawls, and means for raising the pawls to turn their dials one step.

8. An adding machine comprising rotatable dials numbered upon their faces, a gravity member for each dial for turning the same one step at a time, a locking member for each gravity member operated by the turning of the dials to release the said gravity member, and means for simultaneously lifting all of the released gravity members.

9. An adding machine comprising rotatable dials provided with pritning devices, means for forwardly turning said dials, gravity members for turning the dials step by step, means for locking each gravity member in inoperative position actuated to release said gravity member by the turning of the adjacent dial, printing mechanism, and means operated by the operation of the printing mechanism to raise said gravity members and turn the dials one step.

10. In an adding machine, the combination of a series of rotatable dials provided with printing devices upon their faces, a gear for each dial, a rack bar in constant engagement with each gear, means for lifting the rack bars to turn the dials forwardly, means to lock the dials against rearward turning, and means for operating the locking means to release the dials and permit the same to be turned backward by the weight of the rack bars.

11. In an adding machine, the combination of a plurality of dials having printing devices on their faces, a gear for turning each dial, a gravity rack bar in constant engagement with each gear, means for raising said rack bars to turn the dials forwardly, gravity pawls engaging the gears to prevent the backward turning of the dials, printing mechanism adapted to swing into engagement with said dials to print therefrom, and means movable with said printing mechanism to engage and release said pawls from said gears.

12. In an adding machine, the combination of a plurality of dials having printing devices on their faces, gravity members for turning said dials forwardly step by step, means for locking said gravity members in inoperative position actuated to release the same by the turning of the dials, gravity pawls for preventing the backward turning of the dials, printing mechanism adapted to be moved into contact with said dials to print therefrom, means for raising the gravity members to turn the dials one step operated by the actuation of the printing mechanism, and means for actuating the pawls to release the dials.

13. In an adding machine, the combination of a plurality of dials having numerals upon their peripheries, a gear for turning each dial, a gravity rack bar in engagement with each gear, means for lifting said bars to turn the dials forwardly, a pivoted printing mechanism adapted to be swung into contact with said dials, a movable member upon which all of the dials are carried, and means for moving the movable member to disengage the gears from the racks and simultaneously swing the printing mechanism into contact with the dials.

14. In an adding machine, the combination of a plurality of dials having printing devices upon their faces, a gear for actuating each dial, a gravity rack bar engaging each gear, means for lifting said bars to turn the dials forwardly, printing mechanism for printing from the dials, a key for actuating said printing mechanism, and members carrying the dials and gears actuated by the movement of the printing mechanism for bodily moving said gears away from their rack bars to permit the bars to fall.

15. In an adding machine, the combination of a series of rotatable dials, a gear for actuating each dial, a gravity rack bar engaging each gear, means for lifting the rack bars to turn the gears forwardly, a gravity pawl for each gear to turn the same step by step, a dog to hold each pawl in inoperative position, a pin on each dial to engage the dog controlling the pawl for the gear of the adjacent dial and release said pawl, and means operated by the lifting of the rack bars for raising the released pawls to turn their dials one step forward.

16. An adding machine comprising a series of rotatable dials having numerals upon their faces, a gear for each dial, a gravity pawl to engage and turn each gear, a dog to engage and hold each pawl in raised position, means on each gear located in relation to the numerals thereon to engage the dogs for the adjacent dials, means for engaging and simultaneously raising the pawls, a series of pawls for preventing the backward rotation of the dials, and means engaging the gears for turning the dials forwardly.

17. In an adding machine, the combination of a series of number dials, a series of adding dials arranged in longitudinal alinement with the number dials, a vertically movable plate provided with slots of graduated lengths, a series of levers engaging said slots to lift said plate actuating means for turning a number dial and for simultaneously turning a corresponding adding dial, said actuating means being moved by the lifting of said plate, and means for shifting the actuating means longitudinally of said plate and said series of dials.

18. In an adding machine, the combination of a series of rotatable dials, a vertically movable plate having slots of graduated lengths, levers to actuate said plate, a carriage laterally movable upon said plate, and mechanism carried by said carriage to actuate said dials.

19. In an adding machine the combination of a series of rotatable dials, vertically movable members to turn said dials, a vertically movable plate having graduated slots, levers engaging said slots to lift the plate, means for engaging the vertically movable members, engaged with and shiftable longitudinally of said plate and moved by the vertical movement of the plate to raise the members, and means for shifting said means.

20. In an adding machine the combination of a series of rotatable dials, a series of toothed bars to actuate said dials, a vertically movable plate having graduated slots, levers engaging said slots, a carriage upon said plate shiftable longitudinally thereof, means on the carriage for actuating said bars, and means actuated by the movement of the plate for shifting the carriage by a step by step movement.

21. An adding machine comprising two series of rotatable geared dials, a vertically movable plate having graduated slots, levers having ends vertically movable in the slots of said plate, two series of vertically movable toothed bars to turn said dials, a vertically movable carriage carried upon said plate, means for giving a step by step lateral movement to said carriage, and means carried by said carriage for simultaneously actuating one of the toothed bars in each series.

22. An adding machine comprising two series of rotatable geared dials arranged in alinement, a vertically movable plate having graduated slots, levers engaging said slots, a vertically movable bar for turning each dial, a laterally movable carriage upon said plate, means for moving said carriage laterally with a step by step movement, and spindles on the carriage near opposite ends thereof to simultaneously actuate the bars for each series of dials.

23. An adding machine comprising a series of rotatable dials, vertically movable means for turning the dials, a laterally shiftable carriage for raising the dial turning means, a series of actuating levers, a member engaged by said levers to transmit motion therefrom to the carriage, means for manually shifting the carriage, and separate means actuated by the member engaged by the levers for moving the carriage laterally with a step by step movement.

24. In an adding machine, the combination of a series of rotatable dials, a gear for turning each dial, a rack bar engaging each gear, a vertically movable plate having a series of graduated slots, a series of levers engaging said slots, keys to actuate the levers, a carriage on the plate movable therewith and shiftable laterally thereon, means on the carriage for engaging the rack bars, manually operated means for shifting the carriage, and means operated by the actuation of the plate for moving the carriage laterally with a step by step movement.

25. In an adding machine, the combination of a series of rotatable number dials, a series of rotatable dials arranged in longitudinal alinement with the number dials, a gear for each dial, a gravity rack bar engaging each gear to turn the dials forwardly, pawls to prevent the backward rotation of said dials, means for turning each of the adding dials by the forward turning of its adjacent dial, key actuated means for lifting one of the rack bars of the number dials and simultaneously lifting a rack bar of a corresponding adding dial, means for releasing the pawls holding the dials against backward movement to permit the number dials to be turned backward by the weight of their rack bars, and means for moving the adding dials to disengage their gears from their rack bars and permit said dials to turn backward when their pawls are released.

26. In an adding machine, the combination of a series of rotatable number dials, a series of rotatable adding dials, gears for each of said dials, a series of rack bars for each series of dials engaging their gears, a laterally shiftable carriage, means on said carriage adapted to be brought into alinement with one of the rack bars of each series by the shifting of said carriage, means for shifting the carriage, and key actuated means for raising the carriage.

27. An adding machine comprising a series of rotatable number dials, a series of rotatable adding dials, the dials of both series being provided with printing devices upon their faces, means for actuating each series of dials to register numbers thereon, bodily shiftable printing mechanism for engaging and printing the numbers on the dials, and key actuated means for shifting the printing mechanism from operative position adjacent to one series of dials into operative position adjacent to the other series of dials.

28. An adding machine comprising a series of rotatable number dials in horizontal alinement with the number dials and at one side thereof, a series of rotatable adding dials, said dials of each series being provided with printing devices upon their peripheries, means for turning said dials, an inking roll for each series of dials, and printing mechanism movable horizontally from operative position opposite one series of dials into operative position opposite the other series of dials.

29. An adding mechanism comprising two series of rotatable dials numbered upon their peripheries, means for actuating said dials, inking mechanism for said dials, and printing mechanism comprising a printing roller, a printing lever to actuate said roller, and a printing key to actuate the printing lever.

30. An adding machine comprising two series of rotatable dials numbered upon their peripheries, means for actuating said dials, inking mechanism for said dials, printing mechanism, a toothed bar carried by the printing mechanism and a rotatable segmental gear meshing with said bar to move the inking mechanism laterally.

31. An adding machine comprising two series of rotatable dials having numerals, printing mechanism comprising a swinging and laterally shiftable frame and a roll carried by said frame, key operated means for shifting the frame, and separate key actuated means for swinging the frame.

32. An adding machine comprising a series of rotatable dials having numerals upon their peripheries, a gear for each dial, a rack bar for turning each gear, movable brackets for carrying the dials and gears, means for moving the brackets to disengage the gears from the rack bars, printing mechanism comprising a swinging frame and a roll carried by said frame, and key actuated means for swinging the frame and actuating the means for moving the brackets.

33. An adding machine comprising two series of rotatable dials arranged in longitudinal alinement, an inking roll for each series of dials, swinging brackets carrying said rolls, printing mechanism comprising a laterally shiftable and rotatable frame and a printing roll carried by said frame, said frame being adapted to be shifted into position opposite said swinging brackets and to be swung into engagement with said brackets to bring the inking roll into engagement with the dials, and means for actuating said frame.

34. An adding machine comprising a plurality of rotatable dials, means to cause a step by step rotation of said dials, and mechanism to lock said dials in a given position, said mechanism comprising a repeating lever and a repeating key.

35. An adding machine comprising a plurality of rotatable dials, members for forwardly turning said dials, locking mechanism for locking said members in their relative positions and means for actuating the locked members to turn the dials.

36. An adding machine comprising a series of rotatable dials, means to lock the dials, a repeating lever to actuate said locked dials, and a repeating key to actuate said lever, whereby a given number registered upon the dials may be repeated.

37. An adding machine comprising a series of rotatable dials having numerals upon their peripheries, a device for actuating each of said dials, means comprising a repeating key for simultaneously actuating a plurality of said devices, and printing mechanism actuated by said key.

38. An adding machine comprising a series of rotatable adding dials, devices to actuate said dials step by step, mechanism to carry said dials into and out of engagement with said devices, and a crank arm extending to the exterior of the machine for moving said mechanism and holding said dials out of engagement with said actuating devices.

39. An adding machine comprising a series of rotatable dials, vertically movable bars to actuate said dials, a member carried by each bar, means for locking said members in their relative positions, and a repeating lever for simultaneously actuating said members to actuate the bars and turn the dials.

40. An adding machine comprising a series of rotatable dials, vertically movable bars to actuate said dials, spindles to engage said bars to limit their downward movement, and means to lock said spindles in a given position, for the purpose described.

41. An adding machine comprising a series of rotatable dials, gravity bars to actuate said dials, spindles to engage said bars to limit their downward movement, means to lock said spindles in a given position, and mechanism to clear said spindles from said bars to permit the same to drop.

42. An adding machine comprising a series of rotatable dials, vertically movable bars to actuate said dials, a movable head, spindles carried by said head to engage the bars, and means for locking and unlocking the spindles.

43. An adding machine comprising a series of rotatable dials, vertically movable members to actuate said dials, a spindle to engage and lift each member, means for locking and unlocking said spindles, and means extending to the exterior of the machine for simultaneously actuating the locked spindles.

44. An adding machine comprising rotatable dials, vertically movable bars to actuate said dials, devices engaging said bars to limit their downward movement, mechanism to lock said devices in a given position, and a repeating lever to actuate the locking mechanism.

45. An adding machine comprising a series of number dials, means for rotating said dials, means for locking said dials against rotation, a series of rotatable adding dials, means for rotating said dials, comprising vertically movable bars, members adapted to be lifted by said bars, locking mechanism for locking said members in the relative positions to which they are lifted, means actuated by the movement of the locking mechanism for controlling the locking means for the number dials, and a lever for actuating the locking mechanism.

46. An adding machine comprising rotatable dials, vertically movable bars to actuate said dials, spindles carried by said bars and detachably attached thereto, means for locking the spindles, means for moving the spindles to attach the same to and detach the same from the bars, and means for raising the locked spindles to actuate the bars.

47. An adding machine comprising rotatable dials, vertically movable bars to actuate said dials, spindles carried by said bars, means for holding the spindles and moving the same into and out of engagement with the bars, and a lever for raising said holding means to raise the spindles and actuate the bars.

48. An adding machine comprising rotatable dials, vertically movable actuating members for turning the dials, a detachable spindle carried by each of said members, a head in which the spindles are free to reciprocate, means for locking the spindles in the head and means for actuating the head.

49. An adding machine comprising rotatable dials, vertically movable dials for actuating the bars, detachable spindles carried by the bars, means for locking the spindles through which the spindles are free to reciprocate when moved by the bars, means for normally holding the locking means unlocked and in elevated position, and means for moving the holding means to lock the spindles and move said spindles out of engagement with the bars.

50. An adding machine comprising rotatable dials, vertically movable bars to actuate said dials, a forwardly and a rearwardly movable plate provided with vertical guides, a head movable on said guides and provided with a series of openings, spindles in said openings detachably engaging the bars, means for locking the spindles in the head, and means for moving the plate and lifting the head.

51. An adding machine comprising a series of rotatable dials, vertically movable bars for forwardly turning the dials, pawls to prevent the backward turning of the dials, a swinging member to engage and release the pawls, a member detachably engaged with each bar, means for locking said members in their relative positions, means for moving the swinging member into inoperative position, and a reciprocable member for actuating said means and for moving said members into and out of engagement with the bars.

52. An adding machine comprising a series of rotatable dials, vertically movable bars for actuating said dials, spindles detachably engaged with the bars to move therewith, a vertically movable head, means on the head for locking the spindles, horizontally movable guides for the head, manually operated means for moving said guide and head to lock the spindles and disengage them from the bars, and a key operated lever for raising the head vertically.

53. An adding machine comprising a series of rotatable dials, vertically movable bars for actuating the dials, a series of spindles detachably engaged with the bars, a vertically movable head provided with openings for the spindles, means on the head for locking the spindles, a crank arm on the head for operating the locking means, a reciprocable plate having a slot to receive the end of the crank arm, a crank shaft extending to the exterior of the machine, an arm on the crank shaft for moving the plate, and means for lifting the head.

54. An adding machine comprising rotatable dials, a gear for turning each dial, toothed bars for engaging the gears, and mechanism for actuating said bars comprising a plate provided with graduated slots and levers projecting into said slots to elevate the plate in proportion to the length of the slots.

55. An adding machine comprising a series of rotatable number dials, a series of rotatable adding dials, devices to actuate said dials, printing mechanism, a lever to bring the printing mechanism into position to print the numbers on the dials; and a printing key to bring the printing mechanism into operative position to print the totals from the adding dials.

56. An adding machine comprising a series of rotatable number dials, a series of rotatable adding dials, said dials being provided with numerals upon their peripheries, means to actuate said dials to register a desired number thereon, an inking roll for each series of dials, a laterally shifting printing mechanism to print the numbers registered upon said dials, and a number printing key to operate the printing mechanism.

57. An adding machine comprising a series of rotatable number dials, a series of rotatable adding dials, said dials being provided with numerals upon their peripheries, means to actuate said dials to register a desired number thereon, an inking roll for each series of dials, a laterally shifting printing mechanism to print the numbers registered upon said dials, a shifting lever to shift the printing mechanism laterally, and a printing key to actuate said lever.

58. An adding machine comprising two series of rotatable dials having numerals upon their peripheries, means to actuate said dials, inking mechanism for said dials, printing mechanism for said dials, a toothed bar carried by the printing mechanism, a rotatable segmental gear meshing with said bar to move the printing mechanism laterally, a vertically movable bar having a linked connection with said segmental gear, and a lever to actuate said vertically movable bar.

59. An adding machine comprising a series of rotatable number dials, a series of rotatable adding dials, means to actuate said dials to register a number thereon, an inking roll for each series of dials, laterally shifting printing mechanism to print the numbers registered upon said dials, a shifting lever to shift the printing mechanism, and an additional lever to actuate the printing mechanism adapted to engage and actuate the shifting lever.

60. An adding machine comprising a plurality of rotatable dials, means for causing a step by step rotation of said dials, laterally shifting mechanism to hold a desired number of said dials from backward rotation and to restore a desired number of said dials to normal position, whereby the work may be corrected.

61. In an adding machine, the combination of a plurality of rotatable dials, means to cause a step by step rotation of said dials, laterally shifting mechanism to hold a desired number of said dials from backward rotation and to restore a desired number of said dials to normal position, a correcting lever to actuate said mechanism, and a correcting key to actuate said lever.

62. An adding machine comprising a series of rotatable number dials, a series of rotatable adding dials, means to simultaneously actuate corresponding dials in each series, mechanism to hold said dials from backward rotation, and means to lock a desired number of said dials in operated position and to release other dials from operated position at the will of the operator.

63. An adding machine comprising a series of rotatable dials, means to actuate said dials, pawls to hold said dials in operated position, a laterally shiftable member to release any number of the pawls, and mechanism comprising a correcting key for moving said member vertically into engagement with the said pawls and release the dials.

64. An adding machine comprising a series of rotatable dials, gravity pawls to hold said dials in operated position, means for turning the dials, and a laterally swinging and vertically movable bail to release said pawls from the dials, means for swinging the bail and holding the same out of the path of the pawls, and repeating mechanism actuated by the operation of said means.

65. An adding machine comprising a series of rotatable dials, means for rotating said dials, gravity pawls for holding said dials in operated position, printing mechanism for printing from the dials, means for simultaneously releasing said pawls, and separate means for releasing certain of the pawls.

66. An adding machine comprising a series of rotatable dials, means for rotating the dials, a series of pawls for holding the dials in rotative position, a swinging bail to release the pawls, means for holding the bail in inoperative position, and means for releasing one or more of the pawls.

67. An adding machine comprising a series of rotatable dials, means for actuating said dials, gravity pawls to hold the dials in actuated position, a vertically movable and laterally shiftable member to engage and release one or more of the pawls, means for shifting said member laterally, and a correcting key for raising said member.

68. An adding machine comprising a series of rotatable dials, a series of pawls to engage said dials and prevent the backward rotation thereof, vertically movable mechanism to engage any desired number of said pawls to release the same from their dials, a correcting lever to actuate said mechanism, and a correcting key to actuate said lever.

69. An adding machine comprising a series of rotatable number dials, a series of rotatable adding dials, means for actuating corresponding dials in each series, a member for holding each dial in each series from backward rotation, and means for engaging corresponding holding members for corresponding dials in each series to release said members.

70. An adding machine comprising a series of rotatable number dials, a series of adding dials in longitudinal alinement with the number dials, a pawl for holding each dial against backward rotation, and a shiftable member extending adjacent to said pawls adapted to engage and release pawls of corresponding dials in each series and adapted to be shifted to engage one or more of the pawls for each series of dials.

71. An adding machine comprising a series of adding dials, a series of number dials, means for actuating said dials, a pawl for holding each dial in actuated position, a bar to engage and release said pawls, means for shifting the bar laterally, and key operated means for lifting the bar into engagement with said pawls.

72. An adding machine comprising a series of rotatable dials vertically movable bars to actuate said dials, a plate having slots of graduated lengths, levers projecting into said slots, means carried upon said plate to actuate said bars, and a plate having slots engaged by the levers for limiting the movement of said levers.

73. An adding machine comprising a series of rotatable number dials, a series of rotatable adding dials, a vertically movable plate having slots of graduated lengths, levers engaging said slots adapted to lift the plate, keys to actuate the levers, a laterally shiftable carriage having a rack bar, a gear engaging said rack bar, mechanism actuated by the vertical movement of the slotted plate to turn the gear with a step by step movement and means carried by the carriage for actuating a corresponding dial in each series, said means being actuated by the movement of said plate.

74. An adding machine comprising a series of rotatable dials, a laterally movable carriage, means on the carriage for actuating the dials, one at a time, mechanism for shifting the carriage with a step by step movement and actuating the means for turning the dials, a series of gravity pawls for holding the dials against backward rotation, a correcting member carried by the carriage to release the pawls, and means for lifting said member into engagement with the pawls.

In testimony whereof I have affixed my signature in presence of two witnesses.

GEORGE EVERSON.

Witnesses:
ANNA M. SHANNON,
G. E. McGRANN.

Copies of this patent may be obtained for five cents each, by addressing the "Commissioner of Patents Washington, D. C."